3,240,762
MALEIC ANHYDRIDE HYDROGENATED POLY-
CYCLOPENTADIENE REACTION PRODUCTS
Louis P. Wilks and Israel J. Dissen, Chicago, Ill., assignors to Velsicol Chemical Corporation, Chicago, Ill., a corporation of Illinois
No Drawing. Filed Apr. 9, 1965, Ser. No. 447,079
9 Claims. (Cl. 260—78.4)

This invention relates to new compositions of matter. This application is a continuation-in-part of our copending application Serial No. 132,603, filed August 21, 1961, and now abandoned. More particularly, this invention relates to the product of the reaction of maleic anhydride and hydrogenated cyclopentadiene homopolymer, and products thereof, especially, its cured container coatings.

Cyclopentadiene can be polymerized into several distinct polymers each having a different linkage system. The polymer herein understood to be cyclopentadiene homopolymer is the homopolymer catalytically polymerized from cyclopentadiene, having mainly 1,4 linkages in the following manner:

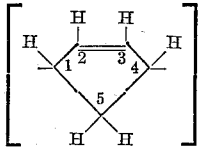

and being soluble in the common aromatic solvents, such as benzene, toluene, and xylene. The hydrogenated cyclopentadiene homopolymer is understood to be the above homopolymer wherein the double bonds between the 2,3-positions are hydrogenated, as hereinafter described.

One object of the present invention is to provide a coating suitable for lining metal containers.

Another object of the present invention is to provide a metal container lining which upon baking remains flexible and adherent for extended aging periods.

Another object of this invention is to provide a sanitary can liner, inert to most food products.

Another object of this invention is to provide a sanitary can liner resistant to the high temperature involved in food sterilization.

Still another object of the present invention is to provide a metal container liner which will not break, chip, or crack during container fabrication and sealing operations.

These and other objects of the present invention will be apparent from the following descriptions.

The above objects can be accomplished by use of the reaction product of the present invention which can be readily produced by reacting hydrogenated cyclopentadiene homopolymer with maleic anhydride at an elevated temperature. Reaction temperatures in the range of from about 275° F. to about 500° F. are operable, while temperatures in the range of from about 350° F. to about 450° F. are preferred. At temperatures below about 275° F., little or no maleic anhydride reacts with the polymer, unless a catalyst is utilized, as hereinafter described; while at temperatures above about 500° F. an undesirable product is produced which yields a brittle, inferior coating. The length of time of reaction depends at least to a large extent upon the temperature of the reaction. Generally, a reaction time of from several hours at the higher temperatures to up to about 30 hours at the lower temperatures is sufficient. It is preferred to utilize a reaction period of from about 2 to about 15 hours when temperatures in the preferred range are used.

A satisfactory and useful product is formed by the reaction of from 1 to about 40 parts by weight maleic anhydride and from about 60 to 99 parts by weight hydrogenated cyclopentadiene homopolymer. It has been found to be convenient to add from about 10 to about 30 parts by weight maleic anhydride to from about 60 to about 90 parts by weight hydrogenated cyclopentadiene homopolymer.

The reaction is conveniently performed in an inert solvent. Suitable inert solvents are the aromatic solvents, such as benzene, toluene, xylene, and the alkylated naphthalenes; the cycloalkanes; and the halogenated alkanes. The aromatic solvents are preferred due to the high solubility of the polymer therein. The amount of solvent used is not critical. A convenient quantity of solvent is from about 10 percent to about 90 percent based on the weight of the homopolymer and solvent solution.

Maleic anhydride reacted into the hydrogenated homopolymer normally constitutes from about 5 to about 15 percent of the weight of the reaction product. Reaction product containing increased numbers of maleic anhydride moieties can be readily produced by the use of a free radical catalyst to initiate and sustain the reaction. A catalytic amount of the catalyst, for example from about 0.1 to about 5 percent by weight based on the weight of the hydrogenated cyclopentadiene homopolymer has been found to be sufficient. The use of a free radical catalyst permits the use of lower temperatures, such as from about 150° F. to about 275° F., and shorter reaction periods, for example, from about ½ to about 5 hours. Generally, free radical sources selected from the azoalkyl, azoaromatic, and diazoaromatic compounds are suitable. More particularly, the following compounds are especially useful as free radical sources: triphenyl methyl azobenzene, 2-azopropane, diazoaminobenzene, diazoamino-p-toluene, benzene diazodimethyl amide, azobisisobutyronitrile, and 1-azocyclohexane.

After the reaction is complete, unreacted maleic anhydride can be removed by methods common to the art, such as by azeotroping with a solvent, such as the solvent utilized in the reaction; precipitation of the reaction product with a liquid such as acetone in which the product is insoluble, while the maleic anhydride is soluble; and the like; to yield a solution of desired reaction product in solvent.

The hydrogenated cyclopentadiene homopolymer utilized as an ingredient in the process for the production of the reaction product of the present invention can be readily produced by reacting catalytically polymerized cyclopentadiene homopolymer with hydrogen gas in contact with palladium catalyst. The homopolymer is agitated and heated until at least 60 percent of the double bonds initially present have been hydrogenated. It is impractical to obtain the homopolymer with more than 95 percent of its initial unsaturation hydrogenated, and therefore it is preferred to hydrogenate the homopolymer until at least 60 percent and up to 95 percent of the unsaturation has been hydrogenated. It is preferred to hydrogenate the homopolymer until at least 80 percent and up to 95 percent of the unsaturation has been hydrogenated.

The use of palladium catalyst enables the cyclopentadiene homopolymer to be hydrogenated to the polymer ingredient of this invention, which is unexpected, since the use of other metals as hydrogenation catalysts, even closely related, such as platinum and nickel, results in entirely different polymer, having different properties and a different infrared spectrum.

The polymerized cyclopentadiene homopolymer, free from polymerization catalyst, is dissolved in a solvent or solvent mixture preferably selected from the group consisting of the aromatics, the cycloalkanes, and the halogenated alkanes. The aromatic solvents are preferred, especially xylene, rather than the chlorinated alkanes which can cause discoloration and gelation, and the cyclic alkanes in which the cyclopentadiene homopolymer is soluble to a lesser extent. The amount of solvent used is not critical. A homopolymer content of 20 percent was found to be convenient for experimental handling, and the preferred concentration will depend upon the hydrogenation apparatus.

A catalytic amount of palladium catalyst is used for the hydrogenation, preferably between about 0.01 and about 1 percent palladium metal based on the weight of homopolymer. The palladium can be supported on any of the common catalyst supports, especially on carbon (charcoal), barium sulfate, and alumina carrier. For example a 10 percent palladium on carbon catalyst was found to be satisfactory.

The hydrogenation is performed at superatmospheric pressure and at an elevated temperature above about 25° C. It is preferred to perform the hydrogenation at pressures above 100 pounds per square inch and at a temperature above 60° C. Hydrogenation pressures in the range of 800–1400 pounds per square inch were found to result in a rate and degree of hydrogenation similar to the rate and degree at 100–150 pounds per square inch. Accordingly, hydrogenation pressures higher than about 150 pounds per square inch are not of practical value. Similarly, temperatures above about 60° C. provide a rapid, easily controllable rate of hydrogenation, while lower temperatures provide a slower rate. If an aromatic solvent is used, temperatures lower than 120° C. are preferable, as the aromatic solvents tend to hydrogenate at a rate which is also a function of temperature.

The rate and degree of hydrogenation of the polymer in the presence of palladium can be increased by the incorporation of from about 1 to about 10 percent of a promoter, such as an organic polar substance, examples of which are organic acids and alcohols which are at least partially soluble in the hydrogenation solution. Acetic acid and n-butanol have been found to be especially useful as promoters.

After the hydrogenation is completed, the palladium catalyst is removed from the homopolymer solution. The method of removal varies with the form of catalyst support used. For example, palladium on carbon can be removed by filtering through a bed of carbon, a bed of catalyst, or a sintered glass funnel. The palladium on carbon can also be removed by adsorption in a column containing methyl cellulose and by centrifugation. Palladium on barium sulfate, which gives a slower hydrogenation rate than the metal on carbon, can be removed by any of the methods stated above. Palladium on alumina can easily be removed by settling and decantation of the polymer solution.

The preparation of the hydrogenated homopolymer ingredient and the reaction product of the present invention and methods of utilizing the latter, will be more clearly understood from the following examples, which are presented by way of illustration and are not intended to limit the scope of this invention.

EXAMPLE 1

*Preparation of hydrogenated cyclopentadiene polymer*

A 13 percent homopolymer-in-xylene solution (150 pounds) of catalytically polymerized cyclopentadiene homopolymer (19.5 pounds), free from catalyst, having mainly 1,4 linkages, being soluble in the common aromatic solvents and having a viscosity of 40 centipoises at 20 percent solids, was charged along with 10 percent palladium on carbon catalyst (136 grams) into a 30-gallon stirred glass-lined kettle. The kettle was flushed with nitrogen gas to remove air, and was pressured with hydrogen gas to a pressure of 120 pounds per square inch.

The contents of the kettle were slowly heated from an initial temperature of 15° C. to approximately 60–70° C. at which temperature the hydrogenation rate was rapid. As the rate decreased, as indicated by the rate of hydrogen uptake, the temperature was slowly increased to about 100° C. The hydrogenation occurred over a period of 3½ hours during which a total pressure drop of about 1235 pounds per square inch was recorded in the hydrogen supply apparatus.

The reaction mixture was then removed from the kettle and poured through a bed of filter-aid to remove the palladium on carbon catalyst. The catalyst-free hydrogenated homopolymer solution was then heated to distill xylene solvent at 140° C. and atmospheric pressure to obtain a solution containing approximately 20 percent polymer. It was determined that approximately 80–85 percent of the homopolymer unsaturation had been hydrogenated.

EXAMPLE 2

*Preparation of the reaction product of hydrogenated cyclopentadiene homopolemer and maleic anhydride*

A 25 percent homopolymer-in-xylene solution of hydrogenated polymer of Example 1 (450 grams polymer in 1350 grams xylene), was poured in a 2-liter beaker. Maleic anhydride (100 grams) was added to the beaker with stirring. The contents of the beaker were heated to 100° C. to melt the maleic anhydride and mix the contents, which were poured in 250 ml. portions into each of eight stainless steel bombs. The bombs were flushed with nitrogen gas to remove air from the air space, sealed, and placed in a constant temperature bath maintained at 400° F., for a period of 4½ hours.

The cooled bombs were emptied into Buchner funnels containing a bed of diatomaceous earth filter-aid and the filtrates therefrom combined. Unreacted maleic anhydride was removed from the combined filtrates by azeotroping the anhydride with xylene. About 2 liters of xylene were added and distilled until the distillate was almost colorless when mixed with dimethyl aniline, indicating almost all of the unreacted anhydride had been removed and the distillation was stopped. Upon cooling, the residue appeared to gel, but xylene was added until a solution was obtained. The solid content of this solution was found to be 27.3 percent, while the amount of maleic anhydride reacted into the homopolymer was 7 percent of the total weight of the reaction product.

A sample of the above reaction product solution was treated alternately several times with pentane to precipitate the reaction product and with carbon disulfide to dissolve the reaction product. A sample of the treated solution was mixed with dimethyl aniline. A lack of color indicated the sample was free of unreacted maleic anhydride. The reaction product in carbon disulfide was coated onto a tin plate by means of a doctor knife and allowed to dry. The film was removed from the plate and mounted for infrared scanning. The scan of the film is shown below compared to a scan of the film of the unreacted homopolymer:

| Wave Length (microns) | Unreacted Homopolymer—Product of Example 1, Percent Transmittance | Reaction Product—Product of Example 2, Percent Transmittance |
| --- | --- | --- |
| 3.3  | 73 | 65 |
| 3.4  | 4  | 1  |
| 3.5  | 10 | 5  |
| 5.4  | ---------------- | 43 |
| 5.6  | ---------------- | 3  |
| 6.35 | 67 | 55 |
| 6.45 | 50 | 40 |
| 8.25 | ---------------- | 40 |
| 9.4  | ---------------- | 39 |
| 11.0 | ---------------- | 25 |
| 13.0 | 83 | 70 |
| 13.5 | 77 | 62 |
| 14.0 | 80 | 75 |

EXAMPLE 3

*Preparation of the reaction product of hydrogenated cyclopentadiene homopolymer and maleic anhydride*

A 250 ml., 3-necked round-bottom flask equipped with internal thermometer, reflux condenser, and heating mantle, was charged with a 35.2 percent solids xylene solution of the product of Example 1 (50 grams polymer in 91.5 grams xylene), maleic anhydride (10 grams) and azoisobutyronitrile (0.5 gram; 1 percent based on the weight of polymer). The mixture was stirred while the temperature was increased to 185–195° F., and maintained thereat for 50 minutes, at which time a viscous liquid was produced, indicating a significant amount of maleic anhydride had reacted, forming the desired reaction product.

EXAMPLE 4

*High temperature preparation of the reaction product of hydrogenated cyclopentadiene homopolymer and maleic anhydride*

A 24.4 percent homopolymer-in-xylene solution of hydrogenated homopolymer of Example 1 (61.4 grams polymer in 188.6 grams xylene) and maleic anhydride (25 grams) was charged to a 250 ml. stainless steel bomb, which was flushed with nitrogen gas to remove air, sealed and placed in a constant temperature bath maintained at 500° F., for a period of 4½ hours. The bomb was cooled and the contents filtered through a bed of diatomaceous earth. Unreacted maleic anhydride was removed by azeotroping xylene until the distillate therefrom was clear. The residue had a solids content of 17.8 percent. A sample of the residue was titrated with potassium hydroxide in alcohol to determine the amount of maleic anhydride reacted into the homopolymer. It was determined that 13.7 percent of the reaction product was due to the maleic anhydride reacted into the homopolymer.

The maleic anhydride-hydrogenated cyclopentadiene homopolymer reaction product of the present invention can be cured into the useful products described herein by heating the said reaction product, preferably with a curing agent, such as an organic polyfunctional compound which tends to modify and improve the cured products. By the term "polyfunctional compound," as used herein, is meant a compound which contains two or more groups to the molecule which are reactive with anhydride groups.

The curing can be carried out by maintaining the curable mixture, or reaction product alone, at a temperature from about 100° F. to about 600° F. The reaction product may be cured at the above temperatures from several minutes to several hours. A high curing temperature will provide cured material in a shorter time than a low curing temperature.

Typical organic polyfunctional compounds which are useful in aiding the curing of the reaction product of the present invention are those which contain epoxy groups, hydroxy groups, amino groups, and the like. An example of a suitable organic polyfunctional compound containing epoxy groups is the condensation product of bisphenol A and epichlorohydrin. Other epoxy compounds containing two or more epoxy groups, such as bis(2,3-epoxycyclopentyl) ether, are equally suitable. Representative of the suitable compounds containing hydroxy groups are glycol, diethylene glycol, triethylene glycol, trimethylene glycol, tetraethylene glycol, and the like. Typical suitable polyfunctional amines, i.e. having at least one nitrogen atom and at least two active amino hydrogen atoms, are ethylamine, propylamine, 2-ethylhexylamine, methanolamine, ethanolamine, aniline, ethylenediamine, phenylenediamine, and the like.

To effect the curing the reaction product of the present invention by the preferred method, from about 0.25 to about 5.0 reactive functional groups of the organic polyfunctional compound per anhydride group of the reaction product are utilized. The polyfunctional compound is mixed with the reaction product, preferably in a solvent, such as an aromatic solvent, and the curable mixture is heated to a temperature in the range heretofore described. Preferably the curable mixture is heated to a temperature of from about 250 to about 550° F. to effect the cure.

EXAMPLE 5

*Method of epoxy curing, coating, baking, and fabricating the reaction product of this invention*

A 20 percent xylene solution of the reaction product of this invention (10.4 grams of product in 41.60 grams of xylene), prepared as described in Example 2 and having an average viscosity of 55–60 centipoises at 77° F., was mixed with liquid (at room temperature) condensation product (1.28 grams) of bisphenol A and epichlorohydrin, and N,N-dimethyl benzylamine (8 drops) until a solution was obtained. This latter solution was coated onto a tin panel in a single layer between about 0.2 and about 0.4 mil in thickness by means of a doctor blade. The panels were baked in an oven for 30 minutes at 400° F. and placed in a punch press which supported dies capable of forming a can lid or end. Thus, a can lid or end was formed coated with the cured reaction product. The can lid or end was then visually inspected for cracks, crazed sections around the deep bends, and pitholes. The can lid or end was immersed for 2 minutes in a solution comprised of 20 percent copper sulfate, 10 percent concentrated hydrochloric acid, and 70 percent water; washed with water; and inspected for black spots which would indicate the solution had reached the tin and copper had plated upon the tin at those places.

The coating film of the cured reaction product of the above example fabricated readily and was free from cracks, crazing, and pitholes. Moreover, no black spots were observed after immersion of the panel in the copper sulfate solution, indicating the coating was free from flaws and pitholes and was resistant to attack from acid. Similar results can be obtained by curing the reaction product of this invention by other methods known to the art.

The cured reaction product compositions of this invention are useful as container liners and especially food-pack cans. Food-pack cans often have a tin coating to prevent the contents from contacting the can itself. Often these tin-lined cans are unsatisfactory since the contents can react with the tin lining, thereby contaminating the contents; the contents can pick up a flavor from the tin liner; or the contents can dissolve the tin liner and attack the steel or iron can. Furthermore the food pack is often filled, hermetically sealed, and then heated to sterilize the pack. This treatment oftentimes accelerates any reaction with the can or tin liner which might otherwise remain unnoticeable.

One method of remedying these defects is the insertion of a relatively inert liner. This liner is preferably applied in liquid form to the iron or tin-coated sheets before fabrication. It must withstand stresses and shocks of fabrication, remain inert, and be appealing to the eye after extended periods of time.

The container liners of the present invention do not crack or craze upon fabrication even after extended periods of standing. Moreover, the liners are relatively inert from chemical attack and are resistant to attack from most food substances. The liners are also relatively stable, and are unchanged by sterilization and other food processing.

We claim:

1. A process which comprises reacting (1) benzene-soluble catalytic cyclopentadiene homopolymer characterized by having 1,4 linkages and having been hydrogenated in the presence of a catalytic amount of palladium until a minimum of 60% and up to 95% of its unsaturation has been hydrogenated, with (2) maleic anhydride at a temperature between about 150° F. and 500° F.

2. A process which comprises reacting (1) a benzene-soluble catalytic cyclopentadiene homopolymer characterized by having 1,4 linkages and having been hydrogenated in the presence of a catalytic amount of palladium until a minimum of 60% and up to 95% of its unsaturation has been hydrogenated, with (2) maleic anhydride at a temperature of from about 275° to about 500° F.

3. A process which comprises reacting (1) a benzene-soluble catalytic cyclopentadiene homopolymer characterized by having 1,4 linkages and having been hydrogenated in the presence of a catalytic amount of palladium until a minimum of 60% and up to 95% of its unsaturation has been hydrogenated, with (2) maleic anhydride in the presence of a catalytic amount of an organic free radical catalyst selected from the group consisting of azoalkyl, azoaromatic, and diazoaromatic compounds, at a temperature of from about 150° F. to about 275° F.

4. A process which comprises reacting (1) from about 60 to 99 parts by weight benzene-soluble catalytic cyclopentadiene homopolymer characterized by having 1,4 linkages and having been hydrogenated in the presence of a catalytic amount of palladium until a minimum of 60% and up to 95% of its unsaturation has been hydrogenated, with (2) from 1 to about 40 parts by weight maleic anhydride, in a solvent, at a temperature of from about 275° F. to about 500° F.

5. A process which comprises reacting (1) from about 60 to about 90 parts by weight of a hydrogenated benzene-soluble catalytic homopolymer of cyclopentadiene characterized by having 1,4 linkages and having been hydrogenated in the presence of a catalytic amount of palladium at a temperature above about 25° C. and at superatmospheric pressure until a minimum of 60% and up to 95% of the unsaturation of the initial cyclopentadiene homopolymer has been hydrogenated, with (2) from about 10 to about 30 parts by weight maleic anhydride, in a solvent, at a temperature of from about 350 to about 450° F.

6. A process which comprises reacting (1) from about 60 to about 90 parts by weight of a hydrogenated benzene-soluble catalytic homopolymer of cyclopentadiene characterized by having 1,4 linkages and having been hydrogenated in the presence of a catalytic amount of palladium, in a suitable solvent until a minimum of 60% and up to 95% of the unsaturation of the initial cyclopentadiene homopolymer has been hydrogenated, with (2) from about 10 to about 30 parts by weight maleic anhydride in the presence of an organic free radical catalyst selected from the group consisting of azoalkyl, azoaromatic, and diazoaromatic compounds, in a solvent, at a temperature of from about 150° F. to about 275° F.

7. The reaction product of the process of claim 1.
8. The reaction product of the process of claim 4.
9. The reaction product of the process of claim 6.

References Cited by the Examiner
UNITED STATES PATENTS

| 2,319,271 | 5/1943 | Soday | 260—93.1 |
| 2,607,761 | 8/1952 | Seymour | 260—78.5 |
| 2,608,550 | 8/1952 | Rowland et al. | 260—78.4 |
| 3,062,800 | 11/1962 | Dissen | 260—93.1 |

JOSEPH L. SCHOFER, *Primary Examiner.*